No. 853,614. PATENTED MAY 14, 1907.
R. E. ADAMS.
VEHICLE.
APPLICATION FILED JULY 6, 1906.
2 SHEETS—SHEET 1.
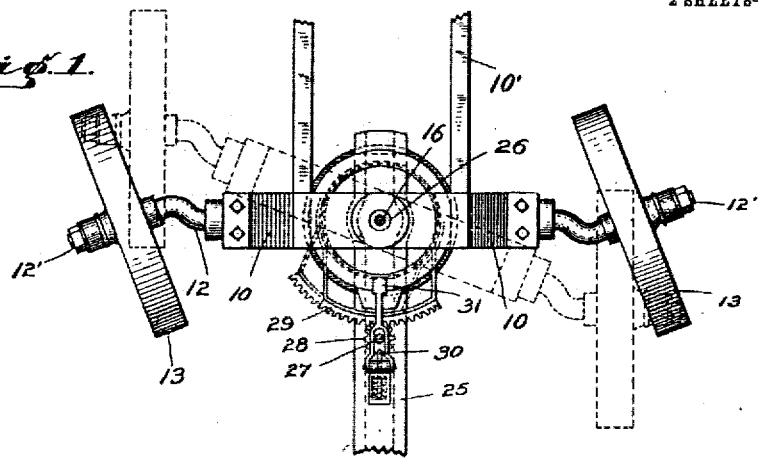
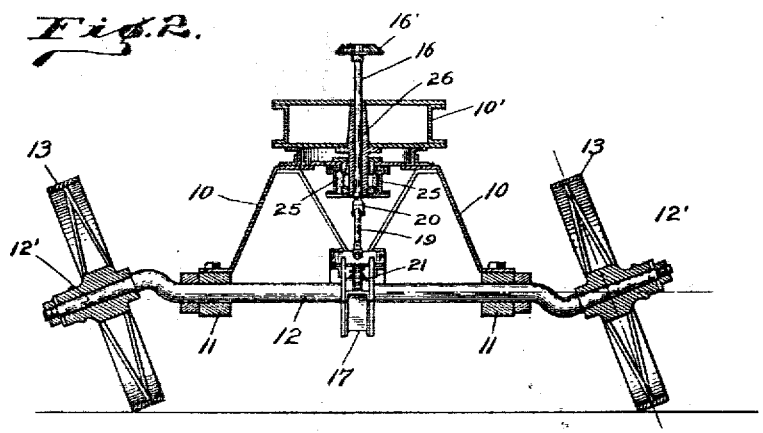
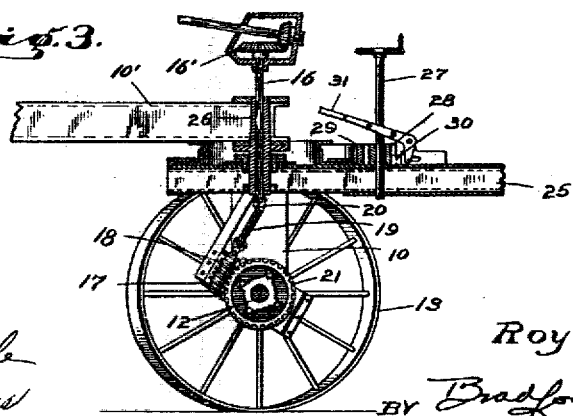
Witnesses
Frank A. Sahle
Thomas W. McMeans
Inventor
Roy E. Adams
By Bradford Hood
Attorneys No. 853,614. PATENTED MAY 14, 1907.
R. E. ADAMS.
VEHICLE.
APPLICATION FILED JULY 6, 1906.
2 SHEETS—SHEET 2.
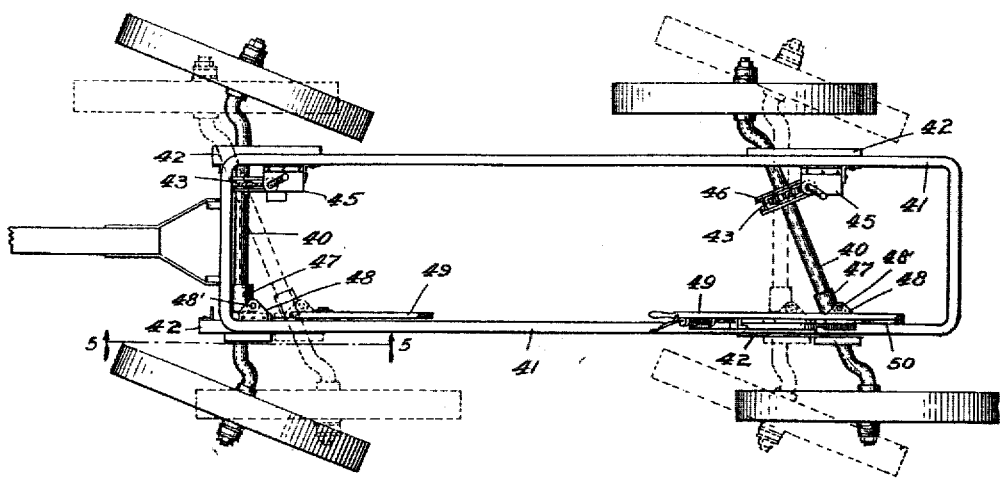
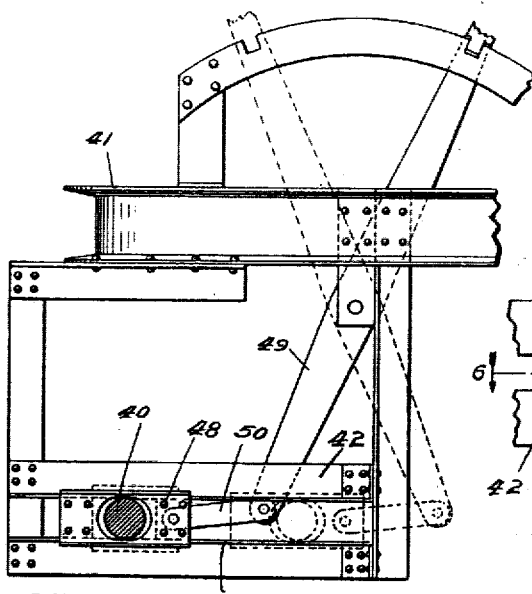
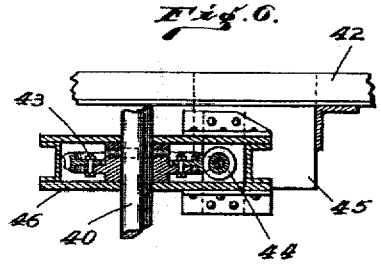
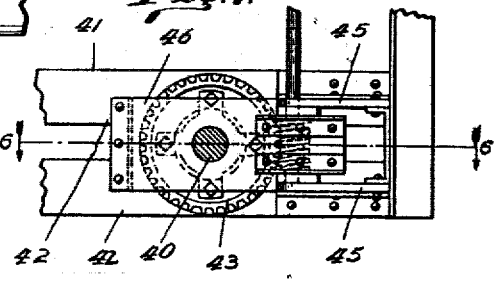
Witnesses
Inventor
Roy E. Adams.
By
Bradford Hood.
Attorneys

UNITED STATES PATENT OFFICE.

ROY E. ADAMS, OF INDIANAPOLIS, INDIANA.

VEHICLE.

No. 853,614.  Specification of Letters Patent.  Patented May 14, 1907.

Application filed July 6, 1906. Serial No. 324,939.

*To all whom it may concern:*

Be it known that I, ROY E. ADAMS, a citizen of the United States, residing at Indianapolis, in the county of Marion and State of Indiana, have invented certain new and useful Improvements in Vehicles, of which the following is a specification.

In the operation of road grading and other similar machines in which dirt is to be shifted transversely, by a longitudinal movement of the vehicle, it is very desirable that one or more of the carrying wheels be tilted from the vertical in order to counteract the side draft produced by the dirt moving implement.

The object of my invention is to produce a simple yet efficient mounting for one or more of the carrying wheels of a vehicle of this type by means of which the inclination of the wheels may be readily reversed.

A further object is to provide means by which the tilted wheels may be straightened up to facilitate transportation of the vehicle.

The accompanying drawings illustrate my invention:

Figure 1 is a plan of a front axle constructed in accordance with my invention, a portion of the superstructure being shown in vertical section; Fig. 2 a vertical section thereof, Fig. 3 is a section at right angles to Fig. 2; Fig. 4 a plan of a modified form; Fig. 5 a detail of means for shifting the axle horizontally; Fig. 6 a section on line 6 6 of Fig. 7; and Fig. 7 a side elevation of mechanism for rotating the axle.

In Fig. 1 10 indicates a superstructure provided with bearings 11 11 in which is journaled the middle portion of an axle 12. Axle 12 is provided at each end with a wheel spindle 12' and these wheel spindles are bent in diametrically opposite directions from the axis of the middle portion 12, and are so positioned relative to the portion 12 that the axis of the portion 12 extended will intersect the medial plane of the carrying wheel 13 on the axis of the spindle 12'. By this means the shaft 12 will lie parallel with the ground in any position of the carrying wheels.

If no reversal of inclination of the carrying wheels is desired, the axle may be fixed in the bearings 11, but I prefer to journal the axle in its bearings and provide some means by which it may be given a half rotation, in order to change the inclination of the wheel spindles relative to the ground, as indicated in dotted lines in Fig. 1. In the form shown in the drawings, the superstructure 10 is pivotally connected to the main frame 10' and I therefore pass a shaft 16 through the axis of the pivotal connection, providing said shaft at its upper end with a gear 16' by means of which it may be turned. Mounted upon the middle portion of the axle 12 is a yoke 17 in which is journaled a worm 18 carried by a shaft 19 connected to the shaft 16 by any suitable means, such as a universal joint 20. The worm 18 meshes with the worm gear 21 attached to the axle or shaft.

In order to facilitate the transportation of the vehicle, when it is not being used in grading, it is desirable to eliminate the inclination of the wheels from the vertical and this may be accomplished by giving the shaft 12 a quarter turn, but when this is done the wheels will stand at an angle to the direction of travel, as shown in full lines in Fig. 1, and in order to eliminate this "lead" the structure 10 may be turned in a horizontal plane relative to the frame 10', to the position shown in dotted lines in Fig. 1. In order to accomplish this result I make the tongue 25 independent of the structure 10 and pivot said tongue upon the same kingpin 26 upon which the structure 10 is pivoted.

Rotatably mounted upon the tongue 25 is a vertical shaft 27 carrying a pinion 28 which meshes with a toothed segment 29 carried by the structure 10 so that by rotating pinion 28 the relation between the tongue 25 and the structure 10 may be varied, so as to bring the wheels into longitudinal alinement with the vehicle.

In order to hold the tongue in any desired position relative to the structure 10 I provide a spring pawl 30 which is adapted to engage the pinion 28, and said spring pawl may be operated by a suitable lever 31.

In operation, the normal position of the wheels, when the vehicle is in use in grading, is that shown in Fig. 2 where the wheels are inclined from the vertical. The inclination may be made more or less by rotating shaft 12 in its bearings 11, but, as the inclination is decreased, the wheels are given a "lead" out of the line of travel of the vehicle until the shaft has been given a quarter turn when the wheels have their maximum lead and stand vertically, as shown in full lines in Fig. 1. If inclination of the wheels from the vertical is desired in the opposite direction the shaft 12 will be continued in its rotation another quarter turn. The lead for any desired inclination will be eliminated by proper adjustment of the tongue. In Figs. 4 to 7 inclusive a different method is shown for bringing the wheels into alinement with the line of travel. In the form shown in these figures the shaft 40 is of the same construction as shaft 12, but it is supported in the frame 41 in longitudinal slideways 42 formed in the frame 41. The shaft 40 carries a worm-gear 43 which meshes with a worm 44 journaled in a bracket 45 on the frame 41. Pivoted upon the shaft of worm 44 is a bracket 46 in which the shaft 40 is journaled, said bracket forming a pivotal support by means of which the shaft 40 may be revolved around the axis of worm 44. Sleeved on shaft 40 is a boxing 47 which is connected to a sliding head 48 by a vertical pivot 48'. Head 48 is mounted to slide in one of the guideways by means of a shifting lever 49 which is connected to the head 48 by a link 50. In this form, in order to bring the wheels into alinement with the line of travel of the vehicle, the shifting lever 49 is used to shift the head 48 and thus swing the shaft 40 bodily around the axis of worm 44. In this form, as well as the form shown in Figs. 1 and 3, the wheels may be given any inclination from the vertical and the lead away from the line of travel be easily eliminated by proper adjustment of the shaft 40 about its own axis and about the axis at right angles thereto, i. e., either the axis of the worm 44 or the axis of the king-pin.

I claim as my invention:

1. The combination, in a vehicle, of a main frame, an axle carrying the same, said axle having a pair of diametrically oppositely-inclined wheel spindles, carrying wheels journaled thereon, and means for holding said shaft in different positions of rotative adjustment.

2. In a vehicle, the combination, of a main frame, a shaft journaled thereon and provided with a wheel spindle inclined from the axis thereof, a carrying wheel journaled on the spindle, and means for holding said shaft in different positions of rotative adjustment.

3. The combination, in a vehicle, of the main frame, an axle provided at opposite ends with diametrically oppositely-inclined wheel spindles, the axes of which intersect the extended axis of the middle portion of the shaft substantially in the wheel planes, and carrying wheels journaled thereon.

4. The combination, in a vehicle, of a main frame, an axle journaled therein and provided at its opposite ends with diametrically oppositely-inclined wheel spindles, the axes of which intersect the extended axis of the middle portion of the shaft substantially in the wheel planes, and means for holding said axle in different positions of rotative adjustment.

5. The combination, in a vehicle, of a main frame, an axle carrying the same, said axle having a pair of diametrically oppositely-inclined wheel spindles, carrying wheels journaled thereon, and means for rotating said axle and holding the same in different positions of rotative adjustment.

6. In a vehicle, the combination, of a main frame, a shaft journaled thereon and provided with a wheel spindle inclined from the axis thereof, a carrying wheel journaled on the spindle, and means for rotating said axle and holding the same in different positions of rotative adjustment.

7. The combination, in a vehicle, of a main frame, an axle journaled therein and provided at its opposite ends with diametrically oppositely-inclined wheel spindles, the axes of which intersect the extended axis of the middle portion of the shaft substantially in the wheel planes, and means for rotating said axle and holding the same in different positions of rotative adjustment.

8. In a vehicle, the combination, of a main frame, a shaft journaled thereon and provided with a wheel spindle inclined from the axis thereof, a carrying wheel journaled on the spindle, means for holding said shaft in different positions of rotative adjustment, and means for shifting the axle in its own plane to bring the wheel into alinement with the line of travel.

9. The combination, in a vehicle, of the main frame, an axle journaled thereon and provided at opposite ends with diametrically oppositely-inclined wheel spindles, carrying wheels journaled thereon, means for holding said axle in different positions of rotative adjustment, and means for shifting the axle in its own plane to bring the wheels into alinement with the line of travel.

10. The combination, in a vehicle, of a main frame, an axle journaled therein and provided at its opposite ends with diametrically oppositely-inclined wheel spindles, the axes of which intersect the extended axis of the middle portion of the shaft substantially in the wheel planes, means for holding said axle in different positions of rotative adjustment, and means for shifting the axle in its own plane to bring the wheels into alinement with the line of travel.

11. In a vehicle, the combination, of a main frame, a shaft journaled thereon and provided with a wheel spindle inclined from the axis thereof, a carrying wheel journaled on the spindle, means for rotating said axle and holding the same in different positions of rotative adjustment, and means for shifting the axle in its own plane to bring the wheels into alinement with the line of travel.

12. The combination, in a vehicle, of the main frame, an axle journaled thereon and provided at opposite ends with diametrically oppositely-inclined wheel spindles, carrying wheels journaled thereon, means for rotating said axle and holding the same in different positions of rotative adjustment, and means for shifting the axle in its own plane to bring the wheels into alinement with the line of travel.

13. The combination, in a vehicle, of a main frame, an axle journaled therein and provided at its opposite ends with diametrically oppositely-inclined wheel spindles, the axes of which intersect the extended axis of the middle portion of the shaft substantially in the wheel planes, means for rotating said axle and holding the same in different positions of rotative adjustment, and means for shifting the axle in its own plane to bring the wheels into alinement with the line of travel.

14. The combination, in a vehicle, of a main frame, a wheel-carrying structure pivotally connected therewith on a substantially vertical axis, a tongue also pivotally connected to the main frame, means for holding said tongue in various positions of angular adjustment relative to said pivoted frame, a shaft journaled in said pivoted frame and provided at its opposite ends with diametrically oppositely-inclined wheel spindles, the axes of which intersect the extended axis of the middle portion of the shaft substantially in the wheel planes, wheels journaled on said spindles, and means for rotating said shaft and holding the same in different positions of angular adjustment.

15. The combination, in a vehicle, of a main frame, a wheel-carrying structure pivotally connected therewith on a substantially vertical axis, a tongue, means for holding said tongue in various positions of angular adjustment relative to said pivoted frame, a shaft journaled in said pivoted frame and provided at its opposite ends with diametrically oppositely-inclined wheel spindles, the axes of which intersect the extended axis of the middle portion of the shaft substantially in the wheel planes, wheels journaled on said spindles, and means for rotating said shaft and holding the same in different positions of angular adjustment.

16. The combination, in a vehicle, of a main frame, a wheel-carrying structure pivotally connected therewith on a substantially vertical axis, a tongue, means for holding said tongue in various positions of angular adjustment relative to said pivoted frame, a shaft journaled in said pivoted frame and provided at its opposite ends with diametrically oppositely-inclined wheel spindles, wheels journaled on said spindles, and means for rotating said shaft and holding the same in different positions of angular adjustment.

In witness whereof, I, have hereunto set my hand and seal at Indianapolis, Indiana, this 28th day of June, A. D. one thousand nine hundred and six.

ROY E. ADAMS. [L. S.]

Witnesses:
THOMAS W. MCMEANS,
ARTHUR M. HOOD.